(12) United States Patent
Cramer

(10) Patent No.: US 9,587,289 B2
(45) Date of Patent: Mar. 7, 2017

(54) VERTICAL DRAINAGE SYSTEM FOR HEAP LEACH PILES

(71) Applicant: James M. Cramer, Centennial, CO (US)

(72) Inventor: James M. Cramer, Centennial, CO (US)

(*) Notice: Subject to any disclaimer, the term of this patent is extended or adjusted under 35 U.S.C. 154(b) by 312 days.

(21) Appl. No.: 14/304,075

(22) Filed: Jun. 13, 2014

(65) Prior Publication Data

US 2014/0367899 A1    Dec. 18, 2014

Related U.S. Application Data

(60) Provisional application No. 61/834,655, filed on Jun. 13, 2013.

(51) Int. Cl.
*C22B 3/02* (2006.01)
*C22B 3/04* (2006.01)
*E02B 11/00* (2006.01)

(52) U.S. Cl.
CPC ............... *C22B 3/02* (2013.01); *C22B 3/04* (2013.01); *E02B 11/005* (2013.01); *Y02P 10/234* (2015.11)

(58) Field of Classification Search
CPC ........................................................ C22B 3/02
USPC ................................................................ 266/168
See application file for complete search history.

(56) References Cited

U.S. PATENT DOCUMENTS

| 4,318,892 A | * | 3/1982 | Von Kohorn | ...... B01D 11/0219 299/5 |
| 5,005,806 A | | 4/1991 | Krauth | |
| 2014/0367899 A1 | * | 12/2014 | Cramer | ...................... C22B 3/02 266/168 |

FOREIGN PATENT DOCUMENTS

WO    WO 2008139430 A2 * 11/2008 ............... C22B 3/02

* cited by examiner

*Primary Examiner* — Scott Kastler
(74) *Attorney, Agent, or Firm* — Baker, Donelson, Bearman, Caldwell & Berkowitz, PC; Royal W. Craig

(57) ABSTRACT

A vertical drainage system for a heap leaching operation comprising vertical drainage conduits for draining fluid pockets down through the strata of a heap pile. The drainage conduits are spaced in a parallel array throughout the ore heap, and are preferably in fluid communication from a top of said ore heap to said one or more collection pipes for draining trapped and avoiding slope or geotechnical failure.

20 Claims, 2 Drawing Sheets

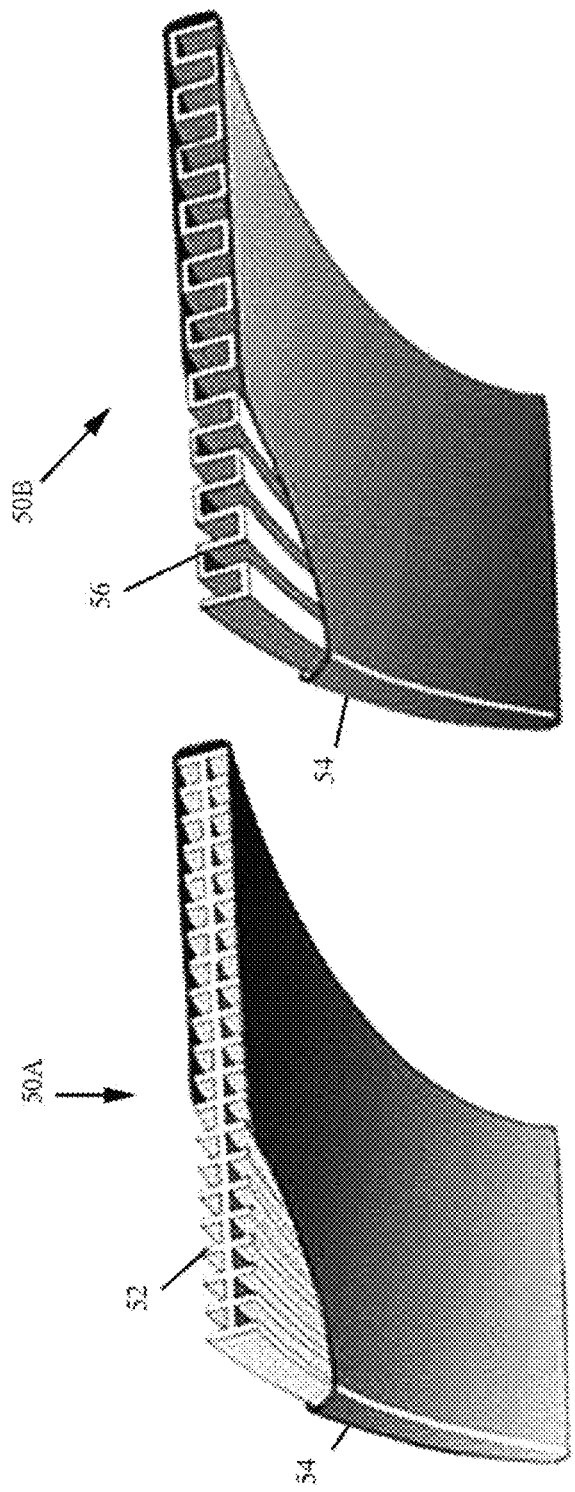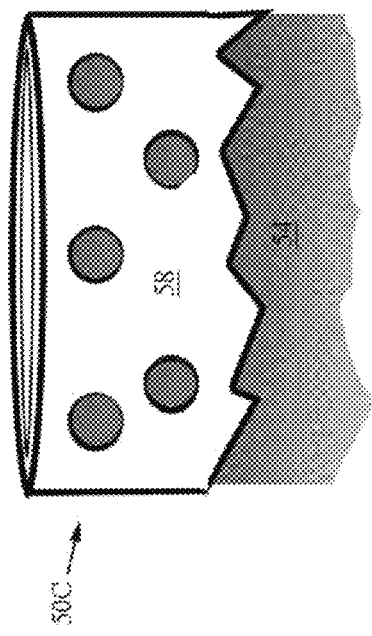

VERTICAL DRAINAGE SYSTEM FOR HEAP LEACH PILES

CROSS-REFERENCE TO RELATED APPLICATION(S)

The present application derives priority from U.S. Provisional Patent Application 61/834,655 filed 13 Jun. 2013.

BACKGROUND OF THE INVENTION

1. Field of the Invention

The present invention relates to the mining industry and, more particularly, to an improved vertical drainage system for a heap leach pile with vertical wicking conduits for draining trapped fluid and porewater down through the strata of a heap pile.

2. Description of the Background

Heap leaching is an industrial mining process to extract precious metals, copper, uranium, and other compounds from ore by percolation. Heap leaching is widely used across North America and the world.

In conventional heap leaching operations a base area of ground is prepared and graded into a sloping foundation, normally a very large area (e.g., 2,500 feet by 1,200 feet), and an impermeable membrane is placed atop the foundation. Some form of collection system is placed on top of the impermeable membrane to collect the residual product. The collection system or "pad" minimally entails a granular cover fill supplemented with perforated drain pipes spaced throughout to collect and transport the operational leach flows. More complex multi-layer heap leach collection pads are also common. Crushed ore is normally heaped onto the collection pad to a depth to 10 to 30 feet and leveled off at the top of the heap. The ore is typically pre-crushed to a desired size. After the foregoing "heap" has been prepared, the target metal is leached from the ore by circulating a leaching solution down through the heap (in a process commonly known as "percolation"). To effect percolation, the solution is distributed over the top of the heap and permitted to seep down through the heap to the collection pad and drain pipes. There are various options for distributing the leaching solution. For example, U.S. Pat. No. 5,005,806 to Krauth discloses a drip system that includes mainline pipes extending longitudinally along a side of a heap, parallel header pipes extending at spaced intervals from the main pipeline across the heap, and parallel, closely spaced tubes extending longitudinally between the header pipes, each tube having a plurality of outlets for leaching solution.

Percolation separates the valuable fraction from the uneconomic fraction of ore, and the metal-laden product solution (called the "pregnant solution") is recovered from the drain pipes. Metals, such as gold, silver or copper, can be recovered from the pregnant solution in a conventional manner, such as by precipitation with zinc dust or aluminum powder, carbon absorption or by electrowinning.

The residual materials left over after the heap leaching process are called "tailings" or "tailings piles" (e.g., mine dumps, culm dumps, slimes, tails, refuse, leach residue or slickens).

Unfortunately leach heaps and tailings piles are large, tall, and have a significant slope or geotechnical failure potential. In the last four decades the mining industry has experienced numerous fatal slope failures or "flowslides." One cause of slope failure is that the solution can accumulate in the tailings pile and become trapped at various elevations. Over time the fraction of leaching solution trapped in the particulate increases. This not only reduces effectiveness of the heap leach pile, but eventually causes geotechnical instability in the piles. Ultimately if not managed the buildup of these fluids can cause a devastating flowslide.

Accordingly, an important object of the present invention is to provide a drainage system for heap leach piles to drain buildup of fluid within the heap pile and avoid geotechnical or slope failure.

SUMMARY OF THE INVENTION

It is, therefore, an object of the invention to provide a vertical drainage system for a heap leaching operation comprising vertical drainage conduits for draining fluid down through the strata of a heap pile. The drainage conduits are spaced in a parallel array throughout the ore heap, and are preferably in fluid communication from the upside of the ore heap to the underlying collection pipes for draining trapped leaching solution. The drainage conduits are spaced in a parallel array throughout the ore heap, and are preferably in fluid communication from the top of the ore heap to the collection pipes for draining trapped fluid and porewater and avoiding flowslide or geotechnical failure. A method of installing a vertical drainage system in a heap leach pile is also disclosed.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 2 illustrates an embodiment of a wicking conduit 50A structure suitable for the drainage system of FIG. 1.

FIG. 3 illustrates an alternative embodiment of a wicking conduit 50B structure suitable for the drainage system of FIG. 1.

FIG. 4 illustrates another alternative embodiment of a wicking conduit 50C structure suitable for the drainage system of FIG. 1.

DETAILED DESCRIPTION OF THE PREFERRED EMBODIMENT

Figure 1:
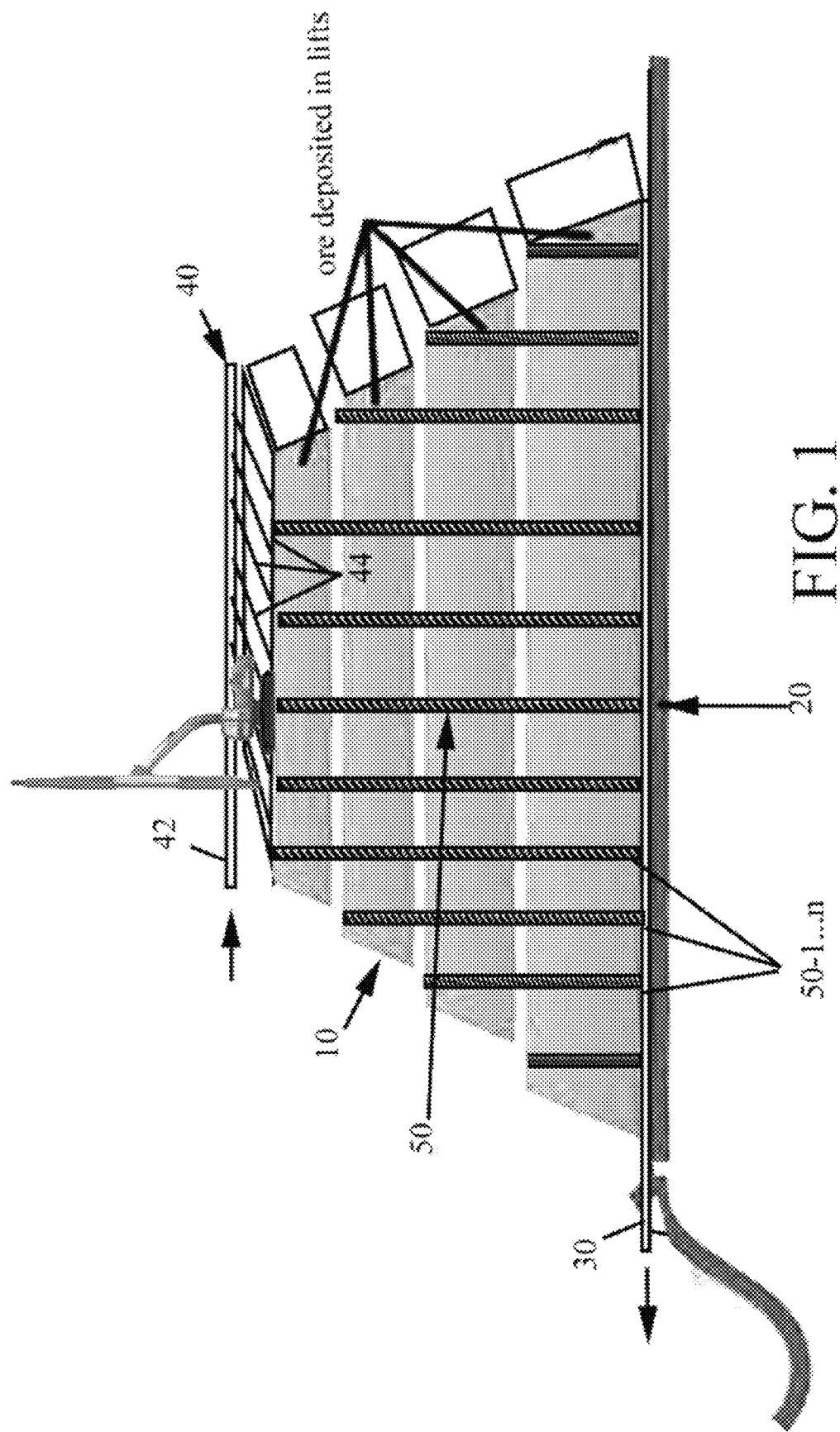
FIG. 1 is a perspective cross-section illustrating an improved vertical drainage system for a heap leach pile according to the invention.

Reference will now be made in detail to preferred embodiments of the present invention, examples of which are illustrated in the accompanying drawings. Wherever possible, the same reference numbers will be used throughout the drawings to refer to the same or like parts.

FIG. 1 is a perspective cross-section illustrating an improved vertical drainage system in a heap leach pile according to the invention. As described above an ore bed is deposited on a graded collection pad 20, which may include one or more plastic sheets placed over an asphalt or compacted clay base layer. In accordance with the invention a granulated collection layer is deposited atop the collection pad 20, and one or more collection pipes 30 are embedded in the collection layer, substantially parallel to the collection pad 20, to divert metal-laden "pregnant" solution out of the heap 10 into a pregnant pond. Pre-crushed ore of suitable size is layered in one or more tiers atop the collection pad 20 to form the heap 10. A controlled percolation system 40 is mounted on the upper surface of an ore bed or "heap" 10 composed of crushed metal-laden ore, such as low-grade gold, silver or copper bearing ores. Percolation system 40 preferably comprises a mainline pipe 42 branching to a plurality of parallel-arrayed header pipes 44 that span the top of the heap 10 for conducting a conventional liquid leaching solution. Each header pipe 44 has a plurality of spaced holes or nozzles along its length for directly emitting the leaching solution onto heap 10 at a controlled and substantially uniform rate. The pregnant solution is recovered through the collection drain pipes 30 (one being shown in FIG. 1) positioned on pad 20. Thereafter, the metals, such as gold, silver or copper, are recovered from the pregnant solution in any well-known conventional manner, such as by precipitation with zinc dust or aluminum powder, carbon absorption or by electrowinning.

In accordance with the present invention, an improved drainage system 50 for the heap leach pile 10 comprises a plurality of vertical wicking conduits 50-1 . . . n spaced in an array throughout the heap leach pile 10 to collect and drain standing fluid vertically at any level of the heap. The wicking conduits 50-1 . . . n, which are described in detail below, operate to drain trapped fluids through the heap leach/tailings pile and down to the collection pad 20 and pipe(s) 30, avoiding geotechnical slope failure.

FIGS. 2-4 illustrate three alternative embodiments of a wicking conduit 50 structure suitable for the drainage system of FIG. 1.

As seen in FIG. 2 wicking conduit 50A includes a rigid support member 52 and porous filter medium 54 surrounding the support member 52. Support member 52 further comprises an elongate central core having a cross-section defined by a flexible latticework of intersecting walls. More particularly, support member 52 may comprise an extruded plastic central core defined by a straight lateral wall and a plurality of short evenly-spaced walls projecting perpendicularly from the lateral wall.

As seen in FIG. 3 wicking conduit 50B includes a rigid support member 52 formed in a corrugated pattern. One skilled in the art should understand that other suitable shapes and configurations may be used in the present invention. In all such cases the patterns of support members 52, 56 define lengthwise channels to permit the free flow of leaching solution along the wicking conduits 50A, 50B. In addition, support members 52, 56 may be perforated along their lengths to further improve drainage. Support members 52, 56 are preferably constructed by extrusion molding of an inexpensive, corrosion-resistant material such as polypropylene or polyethylene. In both cases the support members 52, 56 are encased in a porous filter medium 54 to permit the passage of fluids but prevent solids such as soil particles from entering the interior of wicking conduits 50, which might otherwise restrict the flow of fluid therein. Porous filter medium 54 may be a geotextile such as polyester or polypropylene.

Alternatively, as seen in FIG. 4 wicking conduit 50C includes a rigid tubular support member 58 formed with multiple perforations along its length, and porous filter medium 54 occupies the hollow of the support member 58.

One skilled in the art should understand that other suitable shapes and configurations may be used in the present invention. In all such cases the patterns of support members 52, 56 define lengthwise channels to permit the free flow of leaching solution along the wicking conduits 50A, 50B. In addition, support members 52, 56 may be perforated along their lengths to further improve drainage. Support members 52, 56 are preferably constructed by extrusion molding of an inexpensive, corrosion-resistant material such as polypropylene or polyethylene. In both cases the support members 52, 56 are encased in a porous filter medium 54 to permit the passage of fluids but prevent solids such as soil particles from entering the interior of wicking conduits 50, which might otherwise restrict the flow of fluid therein. Porous filter medium 54 may be a geotextile such as polyester or polypropylene.

Referring back to FIG. 1, wicking conduits 50-1 . . . n may be inserted into the heap 10 in a well known manner by conventional wick drain driving equipment (see FIG. 1) which employs a mandrel assembly using static push and/or vibrating hammer for driving the wicking conduits 50 vertically into the heap 10. The mandrel is then removed from the heap 10 leaving wicking conduits 50-1 . . . n in place in the granular heap 10.

In accordance with the invention, a large number of closely spaced wicking conduits 50-1 . . . n are installed throughout the heap 10 at regular uniformly-spaced intervals. Each wicking conduit 50-1 . . . n traverses the granular heap 10 from one distal end proximate the upper-exposed surface and down through to another distal end abutting or proximate the collection pad 20 containing collection pipe(s) 30.

The exact distance of the spacing may be determined by taking into consideration such factors as soil porosity and permeability, available water treatment facilities, and the time in which it is desired to complete treatment. Where the heap 10 is layered into different tiers (see FIG. 1) the wicking conduits 50-1 . . . n are preferably cut to different sizes and inserted through each individual tier, fully traversing each tier within which they are installed.

In use, recovered liquid from wicking conduits 50-1 . . . n flows downward to the collection pad 20 and outward through collection pipe(s) 30 to the pregnant pond or other holding tank.

It should now be apparent that the above-described invention provides more robust drainage with the vertical wicking conduits 50 for draining fluid down through the strata of a heap pile, thereby avoiding slopeslide or other geotechnical failure.

Those skilled in the art will understand that various modifications and variations can be made in the present invention without departing from the spirit or scope of the invention. It is to be understood, therefore, that the invention may be practiced otherwise than as specifically set forth in the appended claims.

What is claimed is:

1. In combination with a pre-existing heap leach system comprising a controlled percolation system mounted atop a heap of crushed metal-laden ore to percolate leach solution from atop the heap down through the heap to recover a valuable fraction, the ore heap being deposited on a collection pad having a granulated collection layer and one or more substantially horizontal collection pipes embedded in the collection layer, a drainage system, comprising:

a plurality of substantially vertical wicking conduits spaced in a parallel array throughout the ore heap, each wicking conduit being driven by a mandrel downward through and substantially traversing said pre-existing ore heap from an upper-exposed surface thereof to the collection pad, and operating during percolation and consolidation loading of said ore about said plurality of wicking conduits, to collect and drain standing fluid vertically downward throughout the heap, thereby consolidating and maintaining geotechnical stability of the heap.

2. The drainage system according to claim 1, wherein each of said wicking conduits is in fluid communication from a top of said ore heap to said one or more collection pipes for draining trapped and avoiding slope or geotechnical failure.

3. The drainage system according to claim 1, wherein each of said wicking conduits further comprises an elongate rigid support member and a porous filter media surrounding the support member.

4. The drainage system according to claim 3, wherein said rigid support member comprises an elongate central core having a cross-section defined by a latticework of intersecting walls.

5. The drainage system according to claim 4, wherein said latticework of intersecting walls comprises a straight lateral wall and a plurality of shorter walls projecting perpendicularly from the lateral wall at uniform intervals.

6. The drainage system according to claim 1, wherein each of said wicking conduits further comprises an elongate support member having tubular perforated walls and a porous filter media inside the support member.

7. The drainage system according to claim 3, wherein said rigid support member is plastic.

8. The drainage system according to claim 3, wherein said rigid support member comprises a elongate central core having a corrugated cross-section.

9. In combination with a pre-existing heap leach system comprising a controlled percolation system mounted atop a heap of crushed metal-laden ore to percolate leach solution from atop the heap down through the heap to recover a valuable fraction, the ore heap being deposited in cascading tiers on a collection pad having a granulated collection layer and one or more substantially horizontal collection pipes embedded in the collection layer, a drainage system, comprising:
  a plurality of substantially vertical wicking conduits being driven by a mandrel downward through said pre-existing ore heap from an upper-exposed surface thereof to the collection pad in a parallel array throughout the ore heap, said wicking conduits being of different lengths so as to substantially traverse all of the tiers of the ore heap within which said wicking conduits are inserted, and operating during percolation and consolidation loading of said ore about said plurality of wicking conduits to thereby collect and drain standing fluid vertically at any level of the heap, thereby consolidating and maintaining geotechnical stability of the heap.

10. The drainage system according to claim 9, wherein each of said wicking conduits is in fluid communication from a top of said ore heap to said one or more collection pipes for draining trapped and avoiding slope or geotechnical failure.

11. The drainage system according to claim 9, wherein each of said wicking conduits further comprises an elongate rigid support member and a porous filter media surrounding the support member.

12. The drainage system according to claim 9, wherein each of said wicking conduits further comprises an elongate support member having tubular perforated walls and a porous filter media inside the support member.

13. The drainage system according to claim 11, wherein said rigid support member comprises an elongate central core having a cross-section defined by a flexible latticework of intersecting walls.

14. The drainage system according to claim 13, wherein said flexible latticework of intersecting walls comprises a straight lateral wall and a plurality of short evenly-spaced walls projecting perpendicularly from the lateral wall.

15. The drainage system according to claim 11, wherein said rigid support member is plastic.

16. The drainage system according to claim 11, wherein said rigid support member comprises an elongate central core having a corrugated cross-section.

17. A method for constructing a heap leach pile having a vertical drainage system comprising the steps of:
  grading a collection foundation;
  covering said collection foundation with an impermeable sheet;
  placing one or more collection conduits lengthwise atop said sheet;
  depositing a granulated collection layer onto said plastic sheet so as to embed said one or more collection conduits;
  depositing pre-crushed ore in one or more tiers atop the collection layer to form a heap;
  installing a plurality of substantially vertical wicking conduits in a parallel array throughout the ore heap by driving each wicking conduit downward through the ore heap with a mandrel from an upper-exposed surface thereof to the collection pad, and removing the mandrel such that each wicking conduit substantially traverses said ore heap;
  installing a controlled percolation system on the upper surface of said ore heap;
  percolating fluid downward through said ore heap, thereby consolidating and loading said ore about said plurality of wicking conduits;
  whereby said plurality of wicking conduits to collect and drain standing fluid vertically throughout the heap, thereby consolidating and maintaining geotechnical stability of the heap.

18. The method of claim 17, wherein said step of installing a plurality of substantially vertical wicking conduits comprises installing each of said wicking conduits in fluid communication from a top of said ore heap to said one or more collection pipes for draining trapped and avoiding slope or geotechnical failure.

19. The method of claim 17, wherein said plurality of substantially vertical wicking conduits each comprises an elongate rigid support member and a porous filter media surrounding the support member.

20. The method of claim 17, wherein said plurality of substantially vertical wicking conduits each comprises an elongate support member having tubular perforated walls and a porous filter media inside the support member.

* * * * *